(12) United States Patent
Blumenthal

(10) Patent No.: US 7,379,668 B2
(45) Date of Patent: May 27, 2008

(54) OPTICAL AMPLIFICATION IN PHOTONIC SWITCHED CROSSCONNECT SYSTEMS

(75) Inventor: Daniel Blumenthal, Santa Barbara, CA (US)

(73) Assignee: Calient Networks, Inc., San Jose, CA (US)

( * ) Notice: Subject to any disclaimer, the term of this patent is extended or adjusted under 35 U.S.C. 154(b) by 487 days.

(21) Appl. No.: 10/115,680

(22) Filed: Apr. 2, 2002

(65) Prior Publication Data

US 2003/0185488 A1  Oct. 2, 2003

(51) Int. Cl.
*H04J 14/02* (2006.01)
*H04B 10/16* (2006.01)
*H04B 10/18* (2006.01)

(52) U.S. Cl. .............................. 398/48; 398/94; 398/97
(58) Field of Classification Search ............ 398/48–51, 398/94, 97
See application file for complete search history.

(56) References Cited

U.S. PATENT DOCUMENTS

| | | |
|---|---|---|
| 4,053,845 A | 10/1977 | Gould |
| 4,432,599 A | 2/1984 | McMahon |
| 4,894,818 A | 1/1990 | Fujioka et al. |
| 4,927,221 A | 5/1990 | Kiyono |
| 5,471,332 A | 11/1995 | Shiragaki et al. |
| 5,541,756 A | 7/1996 | Chang-Hasnain et al. |
| 5,568,575 A | 10/1996 | Sato |
| 5,583,516 A | 12/1996 | Lembo |
| 5,878,177 A | 3/1999 | Karasan et al. |
| 5,963,682 A | 10/1999 | Dorschner et al. |
| 6,061,369 A | 5/2000 | Conradi |
| 6,097,858 A | 8/2000 | Laor |
| 6,097,859 A | 8/2000 | Solgaard et al. |
| 6,097,860 A | 8/2000 | Laor |
| 6,101,299 A | 8/2000 | Laor |
| 6,157,663 A | 12/2000 | Wu et al. |
| 6,226,424 B1 | 5/2001 | Ball et al. |
| 6,236,481 B1 | 5/2001 | Laor |
| 6,240,222 B1 | 5/2001 | Bergmann |
| 6,253,001 B1 | 6/2001 | Hoen |
| 6,285,500 B1 | 9/2001 | Ranalli et al. |
| 6,320,993 B1 | 11/2001 | Laor |

(Continued)

FOREIGN PATENT DOCUMENTS

WO  WO 99/66354  12/1999

*Primary Examiner*—Leslie Pascal
(74) *Attorney, Agent, or Firm*—Blakely, Sokoloff, Taylor & Zafman LLP

(57) ABSTRACT

An improved photonic switch having optical amplification is described. Signals are amplified before they are switched, after they are switched, or both before and after they are switched. The optical amplification compensates for fixed losses within the switch and transmission system, or provides output power equalization. The photonic switching system includes a demultiplexer for dividing incoming light into different wavelengths or wavebands. The different signals are then supplied to optical amplifiers. The amplifiers amplify the optical signals before supplying them to the optical switch core. Once in the optical switch core, the signals are switched as desired to specified output nodes, then multiplexed back together to provide an output signal from the photonic switching system. In some systems amplification is further provided on the output side. The system also provides a control system by which the optical power of the signals is sensed and controllably amplified to achieve desired results, for example, fixed loss compensation, output power equalization, or other desired levels.

29 Claims, 14 Drawing Sheets

U.S. PATENT DOCUMENTS

| | | |
|---|---|---|
| 6,330,102 B1 | 12/2001 | Daneman et al. |
| 6,347,101 B1 | 2/2002 | Wu et al. |
| 6,456,751 B1 | 9/2002 | Bowers et al. |
| 6,466,711 B1 | 10/2002 | Laor et al. |
| 6,483,961 B1 | 11/2002 | Helkey et al. |
| 6,483,962 B1 | 11/2002 | Novotny |
| 6,490,381 B1 | 12/2002 | Adair et al. |
| 6,525,871 B2 * | 2/2003 | Kosaka ................. 359/337.13 |
| 6,549,691 B1 | 4/2003 | Street et al. |
| 6,549,692 B1 | 4/2003 | Harel et al. |
| 6,560,384 B1 | 5/2003 | Helkey et al. |
| 6,578,974 B2 | 6/2003 | Helkey |
| 6,585,383 B2 | 7/2003 | Helkey |
| 6,587,611 B1 | 7/2003 | Hunt |
| 6,612,706 B2 | 9/2003 | Helkey |
| 6,628,041 B2 | 9/2003 | Lee et al. |
| 6,628,448 B2 | 9/2003 | Ohtsuka et al. |
| 6,643,425 B1 | 11/2003 | Bowers et al. |
| 6,668,108 B1 | 12/2003 | Helkey et al. |
| 6,735,394 B1 * | 5/2004 | Yue et al. ..................... 398/92 |
| 6,792,177 B2 | 9/2004 | Welsh et al. |
| 6,882,800 B1 * | 4/2005 | Graves ........................ 398/46 |
| 6,904,195 B2 | 6/2005 | Bowers et al. |
| 7,127,137 B2 | 10/2006 | Bowers et al. |
| 7,142,744 B2 | 11/2006 | Walter et al. |
| 2002/0122251 A1 | 9/2002 | DeBoynton et al. |
| 2003/0058497 A1 * | 3/2003 | Park et al. .................. 359/127 |

* cited by examiner

OPTICAL AMPLIFICATION IN PHOTONIC SWITCHED CROSSCONNECT SYSTEMS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

This invention relates to optical switching, and in particular to an optical switch employing Micro-Electro Mechanical System technology (MEMS).

Networking technology has become pervasive in the last decade. It is now possible to transmit over six trillion bits per second over a single optical fiber. With these transmission rates, however, has come a bottle neck in the central office where switching is performed to transmit information arriving over one optical fiber onto another optical fiber and toward the desired location. One prior art solution is evidenced by networks in which two trillion bits per second of data arriving on an optical fiber are divided into one thousand parallel two gigabit per second data streams, or ten thousand parallel one hundred fifty-five million bit per second data streams. Each of these data streams is switched using conventional electronic switching technology and then forwarded on to the desired location.

Another well-known technique for accomplishing this switching involves optical cross-connect switches, also known as Optical-Electrical-Optical or OEO switches. In such switches information arrives in an optical form at the switch, it is then converted into electrical form, switched electronically, then converted back into optical form and transmitted on to the next switch. Such an approach has numerous advantages, in addition to using well-established electronic technology for performing the switching. Unfortunately, however, such switching is dependent upon the particular protocol within which the data is encoded, and is extremely expensive, complex and physically large in high data rate implementations, for example forty gigabits per second. Of course, significant electrical power is consumed, and the solution does not scale to changes in data rate, port density or protocol.

As a result of these disadvantages, a switching technology known as the photonic cross connect switch, also known as Optical-Optical-Optical or OOO switch has been developed in which all switching is performed optically, i.e. the data is never converted to electronic form. In the photonic switch, there is no need for conversion of the optical input signal into electrical form, or conversion of the switched electrical signal back into optical form. It offers faster operation, higher capacity and lower power consumption.

FIG. 1a illustrates a prior art MEMS photonic cross connect switch, referred to as PXC 2a, in which mirrors are used that scan in two axes. Multiple optical fiber inputs with an equal number of lenses produce an equal number of approximately collimated input optical beams. (The optical beams are said to be collimated when the diameter of the beams does not change appreciably as the beam propagates.) In the implementation depicted, the beams are produced by positioning the input fibers in a fiber block 10 with an associated lens array 11. Block 10 consists of a two-dimensional array of fibers with a polished end face appropriately aligned to the input lens array 12.

The two mirror arrays consist of an input array 12 and an output array 13. Each array includes movable mirrors which allow a beam from an input optical fiber to be reflected to a desired output fiber. Because each mirror is movable in two axes, the switching is achieved by directing the input beams into different output optical fibers. The mirror position, and therefore the switching operation can be controlled using several different techniques. In one implementation a voltage is used to generate an electrostatic force to rotate the switch mirrors. In another approach, a magnetic field is used to provide magnetic actuation, while torsion bars are used to provide a restoring force for the mirrors. In general, moveable mirror array 12 is populated with as many mirrors as there are fibers in the input/output fiber array. For clarity, however, only a few mirrors are shown in FIGS. 1a and 1b. For a more detailed description of the movement and control of the mirror arrays, see commonly assigned copending U.S. patent application Ser. No. 09/572,979, filed May 16, 2000, now U.S. Pat. No. 6,628,041 B2, entitled A Micro-Electro-Mechanical System (MEMS) Mirror Device Having Large Angle Out Of Plane Motion Using Shaped Combed Finger Actuators And Method For Fabricating The Same.

FIG. 1b illustrates another prior art MEMS PXC 2b, in which a mirror is used to fold the geometry and eliminate some of the components shown in FIG. 1a. In PXC 2b, the input beam passes through the lens array and is reflected by the movable mirror array 12 onto fixed mirror 16. Mirror 16 thus replaces the output moveable mirror array 13, the output lens array 14 and the output fiber array 15. Mirror 16 directs optical beams back to the moveable mirror 12, back through lens array 11, and back into the fiber array 10. Thus the fiber array now becomes both an input and an output array. The mirrored configuration shown in FIG. 1b has the advantage that, in principle, any fiber can be switched to any other fiber, so the fibers do not need to be divided into sets of input and output fibers.

One disadvantage of all of the systems described above is the inherent loss in optical signal power. This fact drives the need to amplify the optical signals. It is well known that in the course of passing through long optical fibers, optical components and switches, the signals are attenuated, and are attenuated differently depending on the nature of the fiber, components and switches, and the actual path that the signals take in the network. One solution to this problem has been to provide amplification of the signals at intermittent locations along the fiber.

FIG. 2 is a schematic illustration of such a typical prior art system employing two wavelength division multiplexing (WDM) optical switches, together with amplification along the fiber connecting the two switches. As shown in FIG. 2, the optical fibers terminate at demultiplexer 22 to which they are optically coupled. Demultiplexed optical signs are input to PXC 32, which may be of the type shown in FIG. 1a or 1b, or some other arrangement. The role of demultiplexer 22 is to take multiplexed signal carried by fiber 20 and break it apart into its constituent signals, for example individual data-bearing wavelengths. In so doing, PXC 32 may operate on each constituent signal independently, for example, passing certain signals on to DWDM transmission system 28, while passing (or receiving) certain other signals to (or from) another network component, for example, a digital cross connect 30 having an optical-to-electrical converter 31 at the interface with PXC 32. Importantly, PXC 32 operates on these signals in the optical domain (without first converting the signals to the electrical domain). Thus, PXC is a type of OOO switch. Digital cross connect 30 requires conversion of the signals from the optical domain to the electrical domain, and thus is a type of OEO switch. In any event, the function of adding or removing constituent signals performed by the PXC 32 as illustrated and discussed above is generally referred to as "grooming." After grooming, those constituent signals which are to be passed to the DWDM transmission system are recombined into a composite or multiplexed signal by multiplexer 33 before being provided to optical fiber 23.

After an appropriate distance 34 (typically measured in miles), the signal(s) on the optical fiber 23 are supplied to a booster amplifier 25, a line amplifier 26, and a pre-amplifier 27 by which the signal(s) are amplified. Eventually the multiplexed signal(s) reach demultiplexer 36. The signal is then demultiplexed, and as previously described, grooming may take place via PXC 37, the constituent signals at this point are passed to yet another multiplexer 43 of DWDM transmission system 29, and so forth through the network. Although the prior art system shown in FIG. 2 does provide amplification, and enables the transmission system to maintain control over the amplifier operation, it may or may not account for the loss in the PXCs.

Regardless of the form of the switch—OOO or OEO— long haul optical transmission systems typically use wavelength division multiplexing (WDM) to carry many optical signals on a single fiber. One problem, however, with WDM systems is maintaining a uniform amplitude among the various signals muxed together into the composite WDM signal, that is assuring that all signals arriving at a particular location are equally powerful, or controllably intentionally of different power levels, depending upon the desired use. This makes it advantageous to controllably balance loss with gain in different optical network elements at the constituent signal level. If this is done by electronic amplification, more complexity and balancing is required to compensate for the electronics. It would therefore be desirable to provide a system in which electrical regeneration is avoided and controllable optical amplification is provided at the constituent signal level.

Another advantage of the invention is that the gain control may be done within a node and across multiple nodes via fiber optical links using control plane software. Typical control plane software can be generalized multiprotocol label switching (GMPLS). Using this kind of control, the amplifier gain can be used to equalize losses across an arbitrary number of switches and network elements based on power sensed at any point within the network

BRIEF SUMMARY OF THE INVENTION

This invention provides an improved photonic switch in which optical amplification is provided for the signals before they are switched, after they are switched, or both before and after they are switched. The optical amplification compensates for fixed losses within the switch and transmission system, or provides output power equalization enabling the optical signals emerging from the photonic switch to have equal (or predetermined) power levels on a signal-by-signal (pre mux) basis.

Preferably, the photonic switching system includes a demultiplexer which is connected to a set of optical fibers. The demultiplexer separates a WDM optical signal into its constituent signals, placing each on its own optical fiber, and supplies those optical signals separately from each other to optical amplifiers. Typically, the amplifiers are provided on a per-wavelength or per-waveband basis. That is, the optical signals can be divided into wavebands, such as the C, L and S wavebands, or into more discrete frequencies, for example on a per-wavelength basis. In one embodiment, the amplifiers amplify the optical signals before supplying them to the optical switch core. Once in the optical switch core, the signals are switched as desired to specified output nodes, then multiplexed back to provide a composite output signal from the photonic switching system.

In another embodiment of the photonic switching system, additional amplifiers are provided on the output side of the optical switch core to amplify the signals before they are multiplexed back onto the optical fibers. The system also provides a control system by which the optical power of the signals is sensed and controllably amplified to achieve desired results, for example, fixed loss compensation, output power equalization, or other desired power levels on a signal-by-signal basis.

Preferably, the optical amplifiers are provided outside the core of the optical switch. This enables the switch construction to be transparent to the particular wavebands, wavelengths, etc., of light switched therein. It additionally allows line cards within the optical switch to be adjusted to meet customer-specific needs, thereby providing more flexibility and reducing costs.

DETAILED DESCRIPTION OF THE INVENTION

This invention relates to the provision of optical amplification within a MEMS switch. Present MEMS switches, such as the Calient DiamondWave™ photonic switch, do not include optical amplification. Thus, there is some loss in signal during the switching process. By providing optical amplification, a no-loss switch, or an amplified switch, is provided. This facilitates overcoming a number of problematic applications, such as increasing the size of a PXC switch beyond 1,000 by 1,000 (a size at which losses become significant), allowing a PXC switch to act as an active or passive wavelength equalizer or regenerator, boosting output power to a desired level to allow easier scaling and design of all-optical networks, etc.

Figure 3:
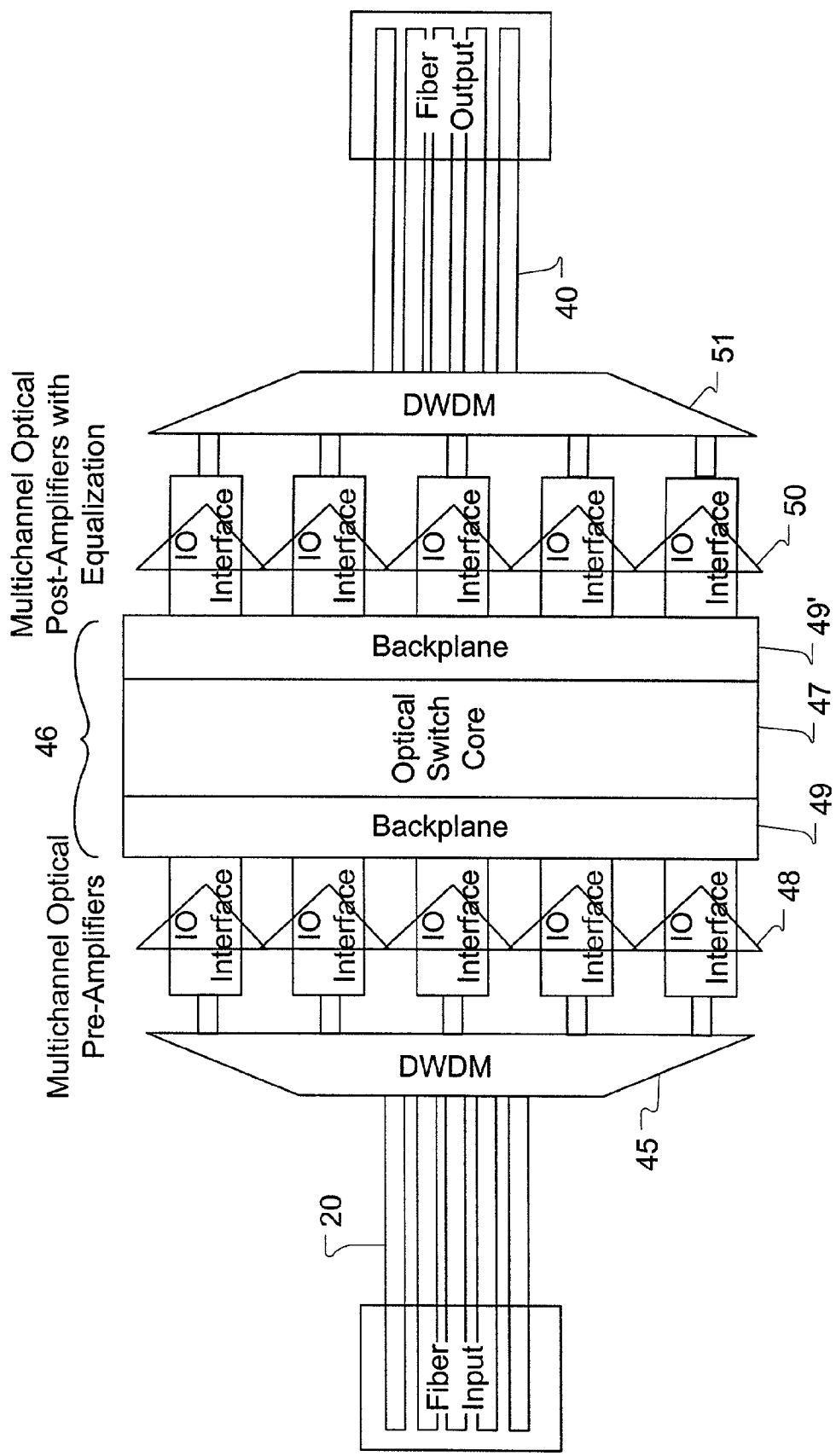
FIG. 3 illustrates an architecture for providing optical amplification at the photonic switch input and output interfaces on a wavelength basis.

FIG. 3 illustrates a first embodiment of the invention in which optical amplification is performed between demultiplexer 45 and PXC 46. As shown in FIG. 3, the optical fiber or fibers 20 are supplied to the wavelength division demultiplexer 45, and then through single channel (single wavelength) optical amplifiers (commonly known as amplets) 48. Amplets 48 may, for example, comprise known erbium doped fiber amplifiers, waveguide amplifiers, semiconductor optical amplifiers, and other appropriate optical amplifier technologies. These optical preamplifiers amplify the optical signals before they are provided to the input back plane 49, optical switch core 47, and output back plane 49' and then switched out onto other optical fibers. If desired, a bank of multichannel optical post amplifiers 50 with (or without) equalization can be provided at the output of PXC 46. Alternatively, amplifiers may be provided only on the output side of PXC 46. After the post amplifiers 50, another wavelength multiplexer 51 returns the multiplexed signals to the output fiber bundle 40. In FIG. 3, the optical amplifiers are provided within the input and output interfaces of the optical switch, and may be individually controlled, so that they can be used to manage power levels, compensate for losses, and equalize loss nonuniformities which are a function of wavelength or other parameters, and other applications on a signal-by-signal basis. This allows amplification based on the selection of line cards, enabling each switch to be customized to the needs of the customer or location, without impacting the design of the optical switch core 47 itself. Thus, the apparatus of FIG. 3 provides optical amplification at the input and/or output interfaces on a waveband basis. A waveband is a collection (group) of wavelengths that are kept together throughout the transmission, switching and amplification process.

Figure 4:
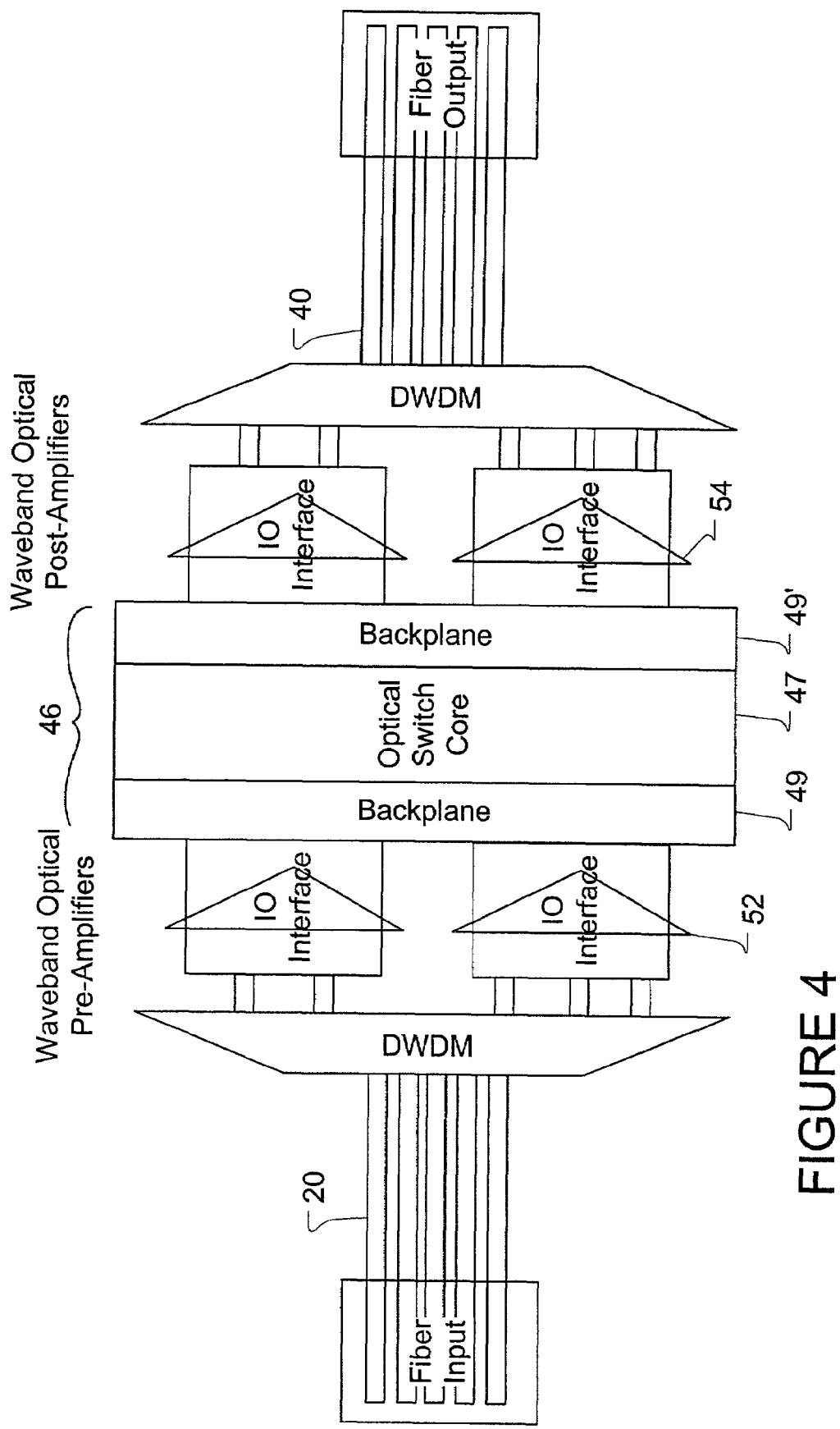
FIG. 4 illustrates an architecture for providing optical amplification at the photonic switch input and output interfaces on a waveband basis.

In contrast, FIG. 4 illustrates the provision of optical amplification at the switch input and/or output interfaces on a waveband basis. As shown in FIG. 4, the fibers provide signals to, and receive signals from, the same apparatus. In FIG. 4, however, rather than provide a separate amplifier for each wavelength, the wavelengths are grouped into "bands" with each band being amplified separately. As shown, optical amplifiers 52 and 54 provide amplification on groups of wavelengths as necessary. The optical amplifiers may, for example, comprise known erbium doped fiber optic amplifiers. While the approach of FIG. 4 does not allow tuning of the amplification to as fine a degree or resolution as FIG. 3, that is, on a wavelength by wavelength basis, it does provide amplification largely where it is needed most, that is, on a group of wavelengths, i.e., a waveband. It also reduces the number of amplifiers, and hence the cost, required to configure PXC 46.

Figure 5:
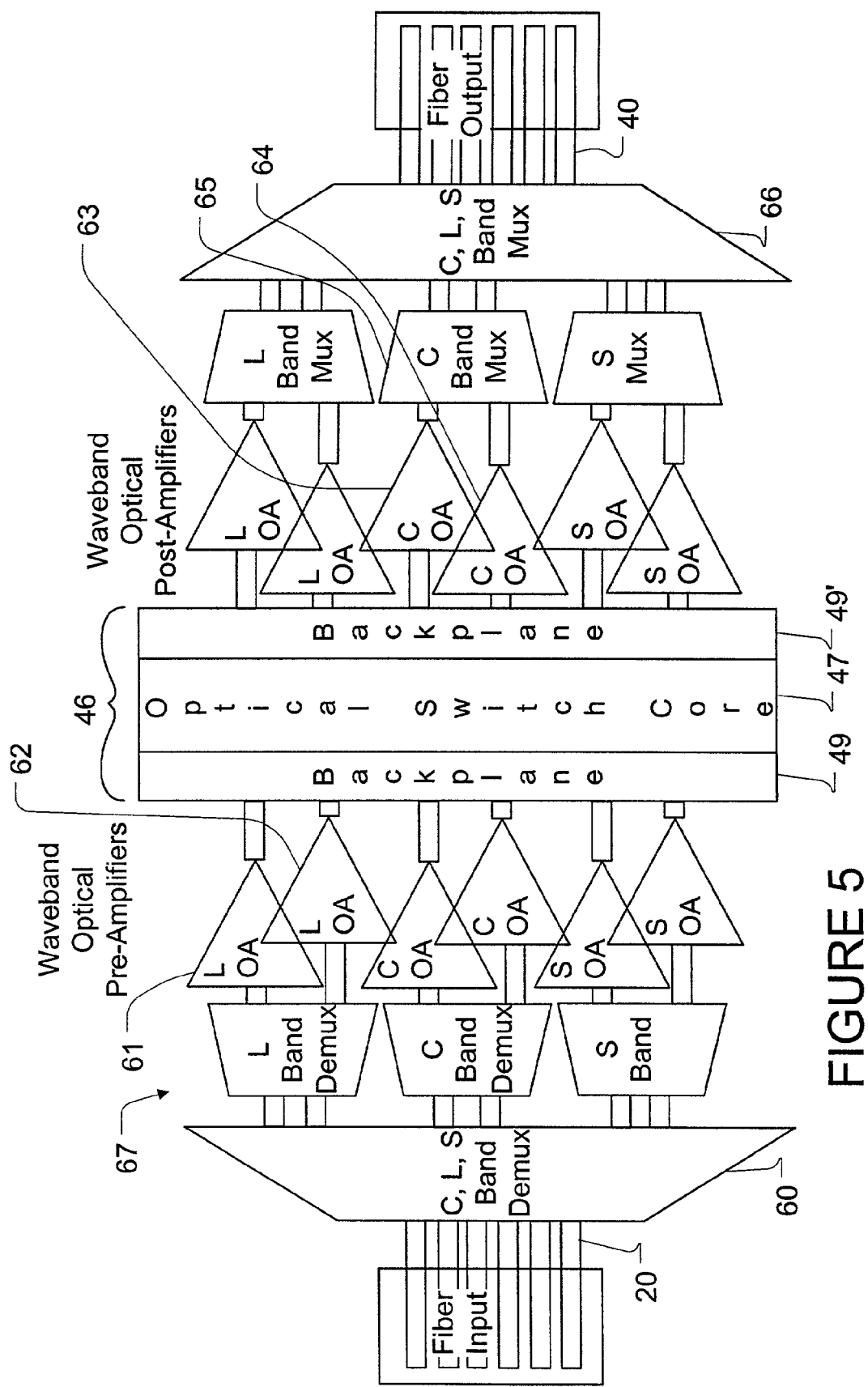
FIG. 5 illustrates an architecture for waveband specific optical amplification at the input and output interfaces.

FIG. 5 is a schematic diagram illustrating how waveband multiplexing may be combined with specific amplification of particular wavebands to provide overall optical amplification in an optical switch. Because optical amplifier technologies are often more cost effective (or technologically feasible) when used to amplify specific regions (wavebands) of the optical spectrum, this is important. Instead of using one very expensive or complex amplifier to boost all wavelengths, this technique separates out wavebands first and then directs these wavebands to the appropriate optical amplifier. As shown, the fiber bundle 20 is provided to a band demultiplexer 60. Demultiplexer 60 demultiplexes the incoming optical signals into L, C, and S-bands. In a preferred embodiment, the C-band is the conventional waveband extending from 1528.77 to about 1563.04 nm. The L-band is the long wavelength band, extending from about 1570.42 to 1603.17 nm. The S-band is the short wavelength band, and extends from about 1520 to 1535 nm. Each of the wavebands may then be further demultiplexed, if desired, by a second stage of demultiplexers 67. By demultiplexing in this manner, future changes in technology with respect to transmitted wavelengths can be accommodated, yet amplification can be provided with respect to the specific needs of the frequency band of interest.

As shown in FIG. 5 the further demultiplexed L-band signals are provided to two (or more) optical preamplifiers 61 and 62. Similar demultiplexed signals on the C-band and the S-band are provided to the corresponding optical preamplifiers, as well. All of the optical preamplifiers are coupled to the back plane 49 of PXC 46. After switching, if desired, optical post amplifiers can be applied to the signals in the same manner. For example, waveband post-amplifiers 63 and 64 are shown receiving signals from back plane 49' and providing them to a C-band multiplexer 65. Once the C, L and S-bands are individually multiplexed, all three bands may be multiplexed together by multiplexer 66, to place output signals on fiber bundle 40. Of course, other known multiplexing arrangements may also be used.

The preceding has been a description of the overall system architecture of the invention as it applies to providing optical amplification in PXC switches. The system provided is scaleable, can be configured for different optical wavebands as new technologies appear, compensates for loss in the optical switch, and provides for equalizing (or individually adjusting) channel power at the switch output so that each signal is of relatively the same (or a desired) magnitude. Finally, the system also provides a technique for assuring that a specified output power level is provided at each channel, which power level is independent of the power level of the input signal or the power level of other constituent signals in the multiplexed signal.

Figure 6:
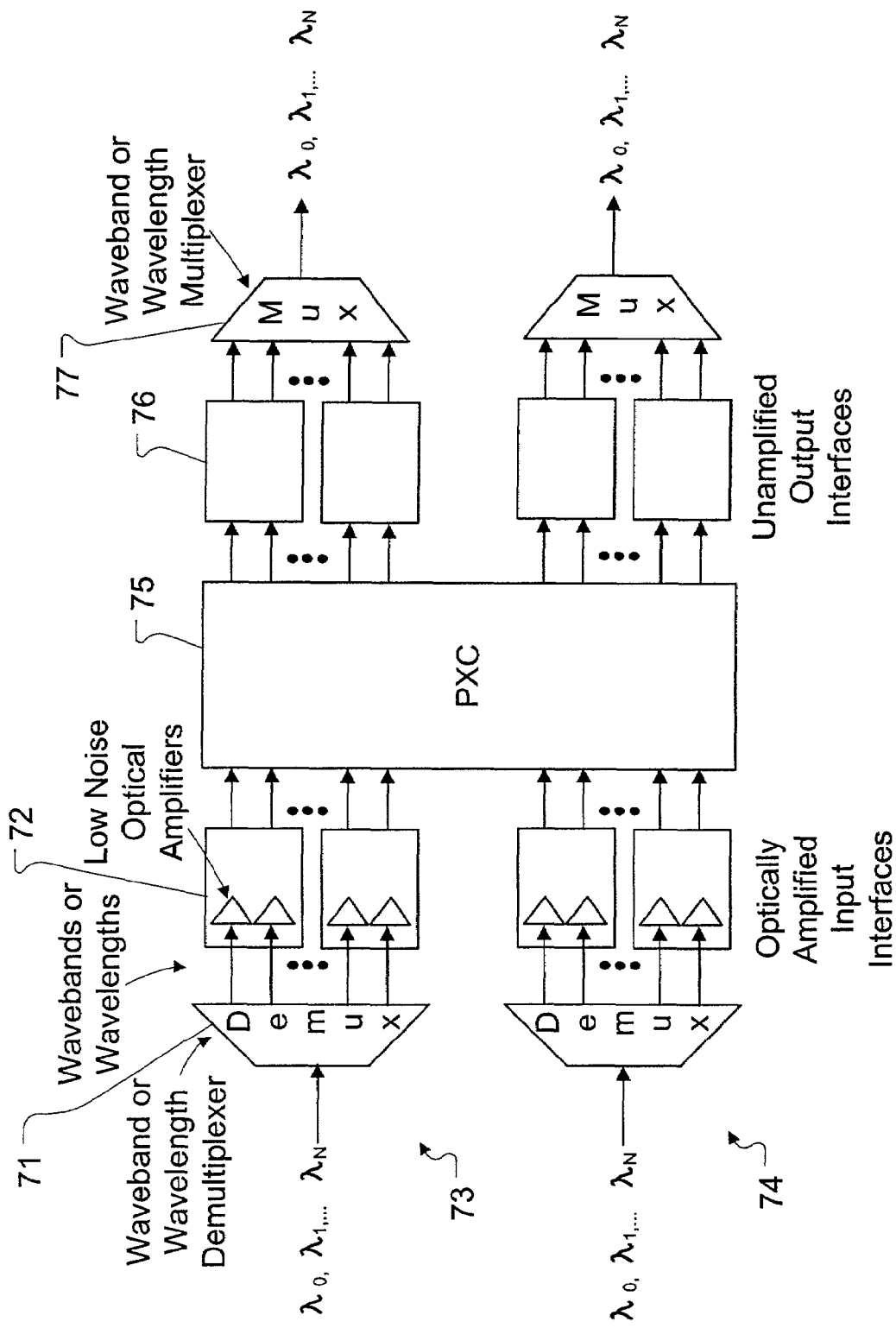
FIG. 6 illustrates a photonic switch with only input amplification for gain equalization.

FIG. 6 is a schematic diagram which illustrates the optical amplifiers located at the input interfaces, just after the wavelength or waveband demultiplexing. The wavelengths entering the wavelength demultiplexers have been transmitted down a section of fiber from another node in the network. The fiber bandwidth is very large and these wavelengths can span multiple channels and wavebands. The demultiplexers 71 are shown, together with low noise optical amplifiers 72 for two input stages 73 and 74 to the PXC 75. (In the same manner as discussed above, if desired, optical amplifiers 76 may be employed prior to the multiplexing operation 77 and provision of signals on the output fiber.) For the implementation shown in FIG. 6, each amplifier accepts a signal with an input dynamic range (pmin and pmax) and amplifies that signal by a known amount. As shown, the output interfaces are not amplified. In this embodiment all amplification of the signals results from amplifiers 72 applied to the input side of the optical switch. The signal gain may be measured using taps and monitors, as is described below in conjunction with FIG. 7.

Figure 7:
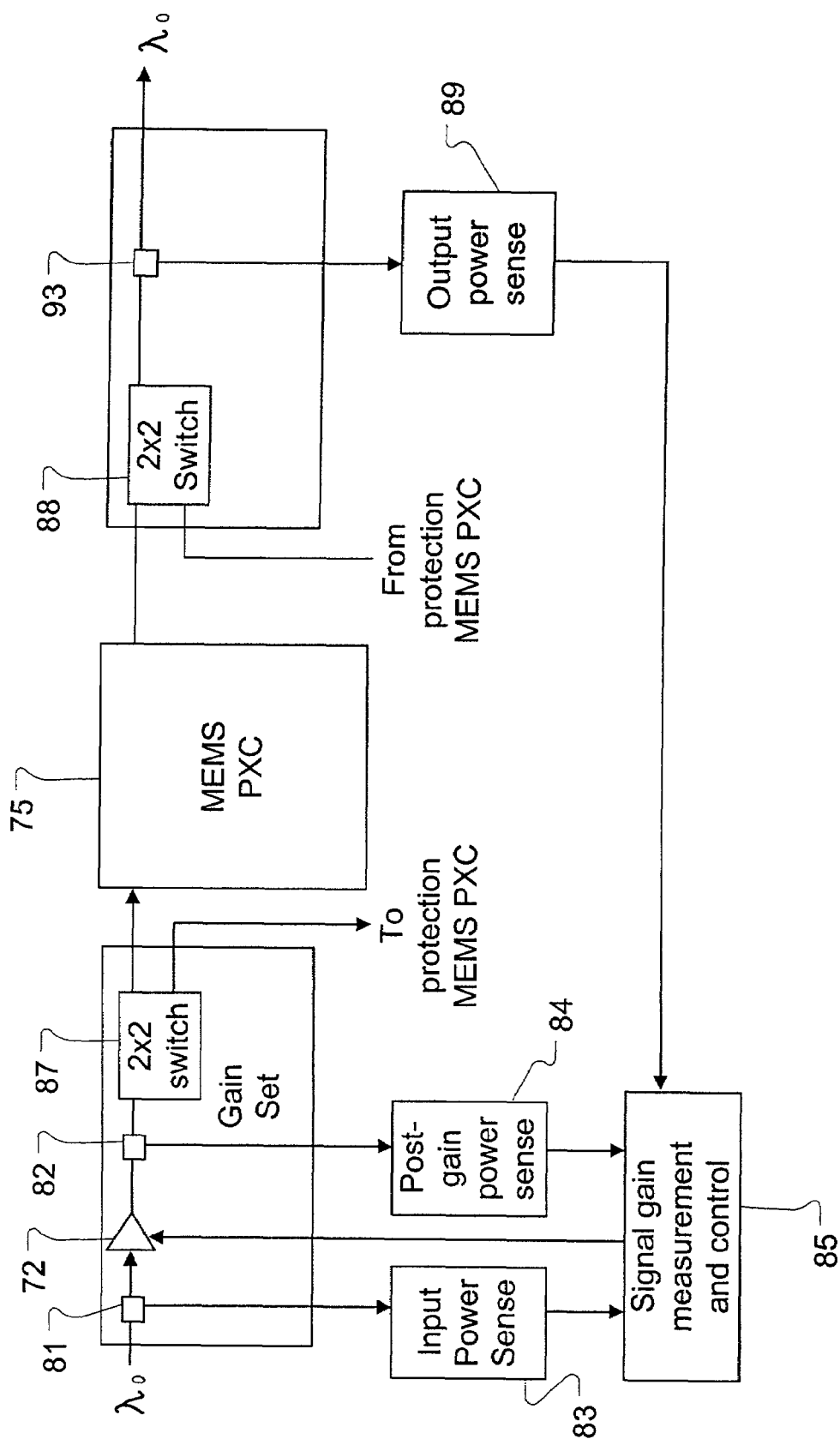
FIG. 7 is a diagram of a control system for the switch of FIG. 6.

FIG. 7 is a diagram illustrating a control system including taps and monitors for determining and controlling the extent of required signal amplification. As shown in FIG. 7, the input power is sensed at a node 81, for example, by use of a tap on the fiber coupled to a well known input power sensing circuit 83. After amplification, the power is sensed again, this time at node 82 by post-gain power sensing circuit 84. Using known technology, the input power sensed by circuit 83 and post gain power sensed by circuit 84 are compared, and appropriate control signals are provided to amplifier 72 from a known signal gain measurement and control circuit 85.

While not previously shown, FIG. 7 illustrates a protection mechanism applicable to any embodiment of a PXC system described herein. Namely, each input signal may be split and provided to parallel switch cores, such that should one switch core fail, the other switch core may provide continued and uninterrupted operation of the PXC. Specifically, a 2×2 protection switch 87 is provided after amplifier 72. The switch is controlled by a protection circuit (not shown). The protection circuit assures that in the event of failure of switch 75, its functionality is provided by a stand-by switch core (not shown). Output signals from the PXC 75 are also provided to a 2×2 switch 88, which also receives, at its other input, signals from the stand-by switch core.

Continuing now with the discussion of amplification, a known output power sense circuit 89 measures the output power of the signal at node 86 at the out put of the PXC 75. The output of circuit 89 is also provided to circuit 85 for the purposes of determining, from a comparison of signal strength at the input and output sides of the PXC 75, the extent, if any, of power correction required to account for power loss attributable to PXC 75. The control system shown in FIG. 7 allows balancing PXC and interface card losses with gain to assure overall improved operation of the system.

Figure 8:
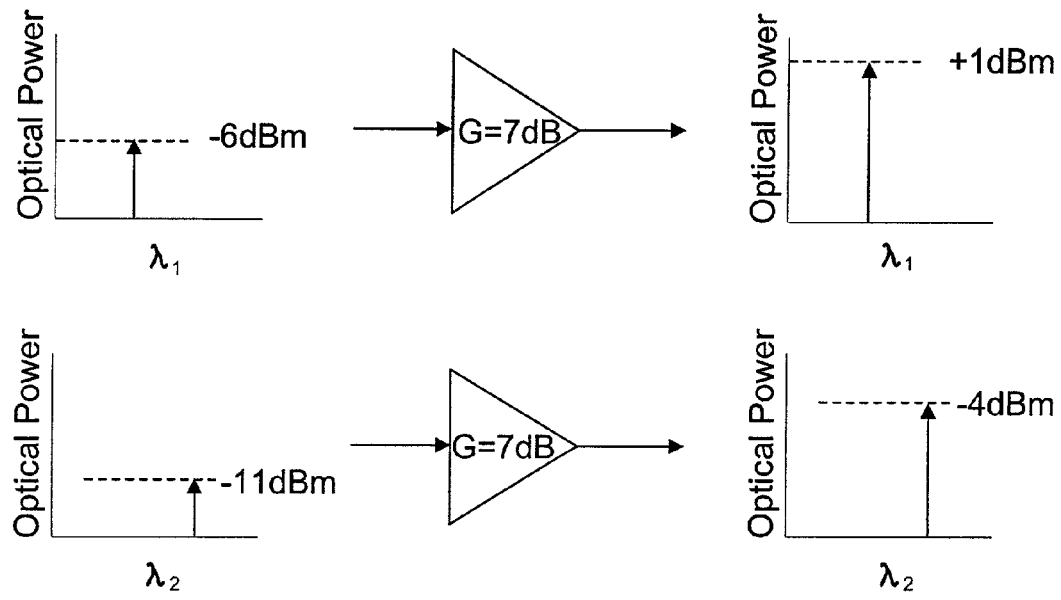
FIG. 8 illustrates an example of fixed loss compensation.

The system shown in FIG. 7 can be employed primarily in two different modes. In the first mode, referred to as loss compensation mode, optical losses in the PXC are compensated for by amplifying the pre-PXC signal. As shown, in FIG. 8, exemplary input beams with two different input power levels, −6 dB for λ1 and −11 dB for λ2 are provided on two different wavelengths. Assume, for example, that a switch through which these wavelengths must pass must meet a maximum loss budget of −4 dBm. If the pre PXC amplification is not controlled on a signal-by-signal basis, but rather the amplification is chosen such that the farthest outlying signal is brought to within specification for loss budget (all other signals being equally amplified), then by applying a fixed 7 dB gain the greatest loss through the PXC is λ2, having a −4 dB output signal which is within specification.

The second mode of operation for the control circuit shown in FIG. 7 is referred to as output equalization mode. The choice of mode is determined by the user in settings of software to control the switch for operation. In equalization mode, amplifier gains are set on a signal-by-signal basis so that the output power is equal for all channels. The maximum output power thus will be determined by the weakest input channel, which requires the maximum gain. Operating in this manner means that other channels may be attenuated. The attenuation can be provided either with the optical amplifier, by deliberate and controlled misalignment of the optical switch path, or using any other well known approach.

Figure 9:
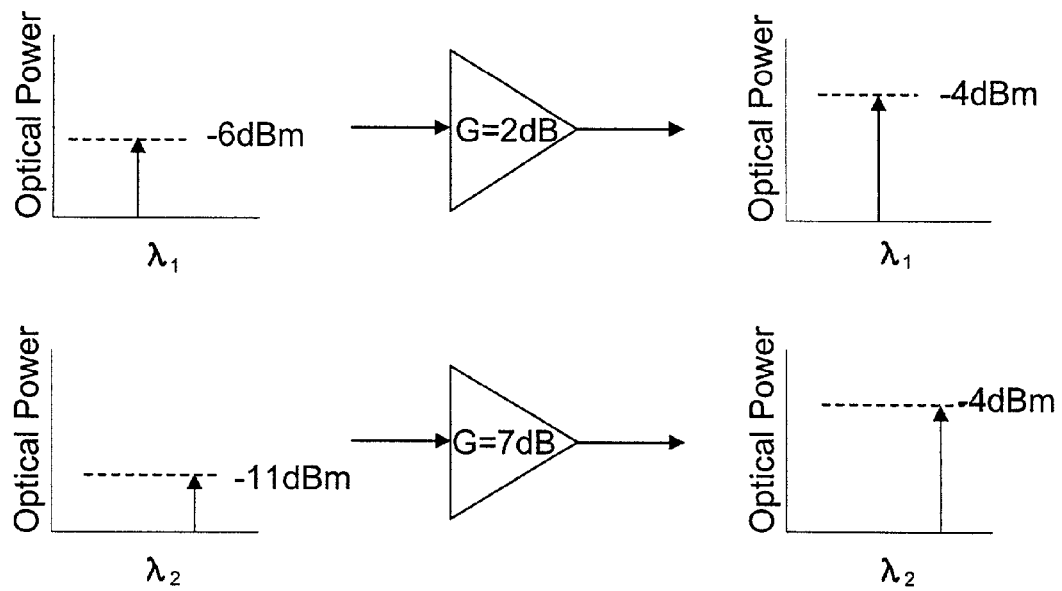
FIG. 9 illustrates an example of output power equalization.

FIG. 9 illustrates output power equalization. In the circumstance depicted, two optical signals arrive, one with optical power of −6 dB for λ1 and one with −11 dB for λ2. The equalization is provided by use of circuit 85 in FIG. 7 to control the gain of amplifier 72 based upon the sensed output power from circuit 89 and its comparison with the output power of other channels. FIG. 9 illustrates how λ1 will be amplified by 2 dB to raise it to −4 dB, while λ2 is amplified by 7 dB to raise it to −4 dB. In this manner the same output power is available on each channel.

Figure 10:
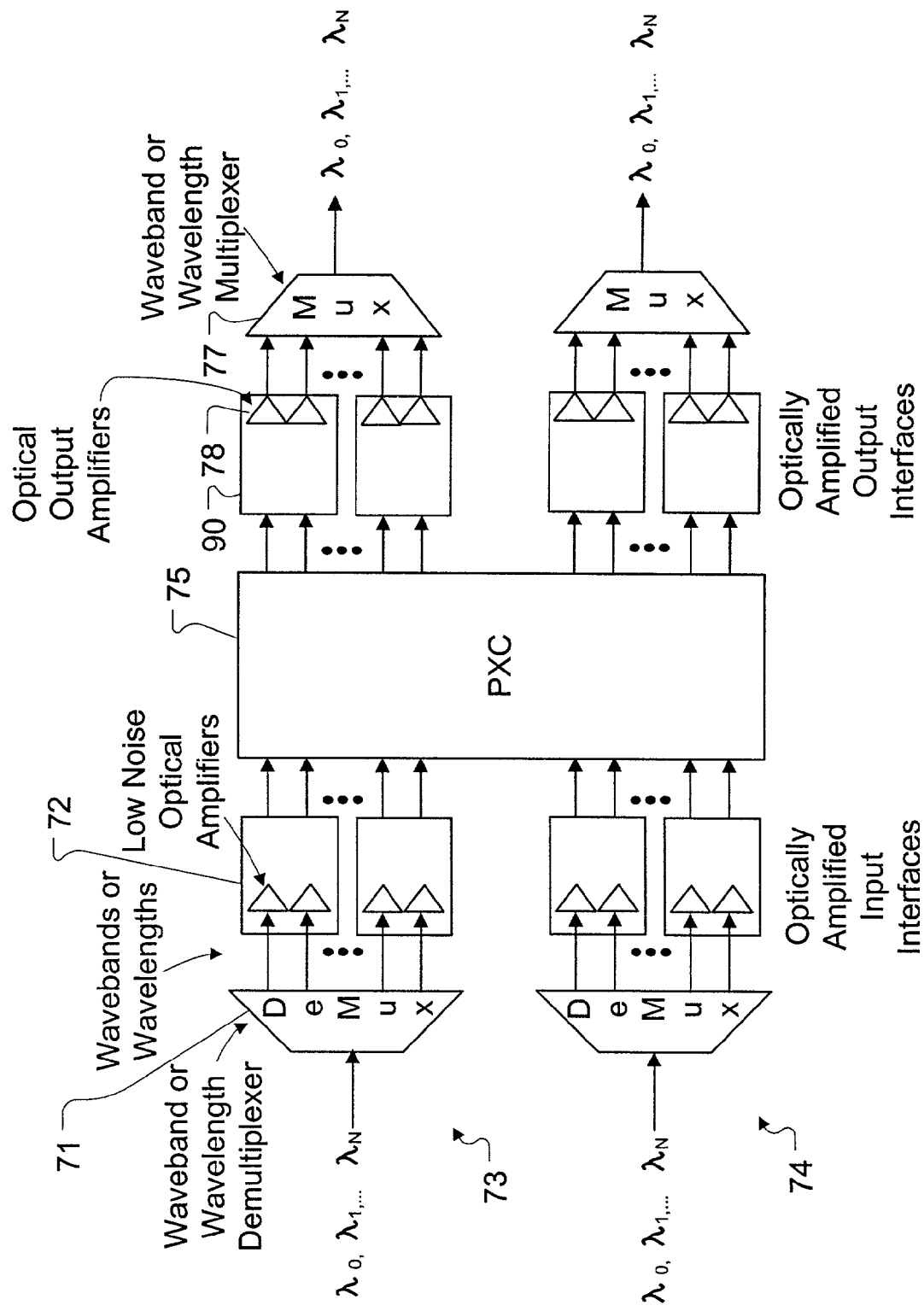
FIG. 10 illustrates a photonic switch with both input and output amplification.

FIG. 10 is a diagram similar to FIG. 6. FIG. 10, however, illustrates an embodiment of the invention in which the input interfaces and the output interfaces each have amplification. (In the embodiment of FIG. 6 only the input side was amplified.) The elements depicted in FIG. 10 have been given corresponding reference numerals to those in FIG. 6, except that the output interfaces are now designated to reflect their inclusion of output optical amplifiers 78. For the embodiment depicted in FIG. 10, the input amplifiers 72 are used to boost the input signal's dynamic range with a fixed gain to compensate, for example, for switch losses. In a manner similar to that described with respect to FIG. 7, a series of taps and monitors are provided to detect the power levels and provide appropriate amplification. These taps and monitors coupled to known control circuitry will be described in conjunction with FIG. 11. The use of optical amplifiers at the input and output stages provides the functionality of input amplification as described above in conjunction with FIGS. 6 and 7, and also provides the additional capability to equalize the output power of all channels independently of the power level of the input signals. Of course, if it is desired to amplify some wavelengths or wavebands more than others, for example, to "pre-compensate" for expected downstream losses, this can also be provided. Post PXC amplification allows a wide variation in input signal to be boosted up to a common level so that the switching node has truly regenerative qualities from the network design point of view.

Figure 11:
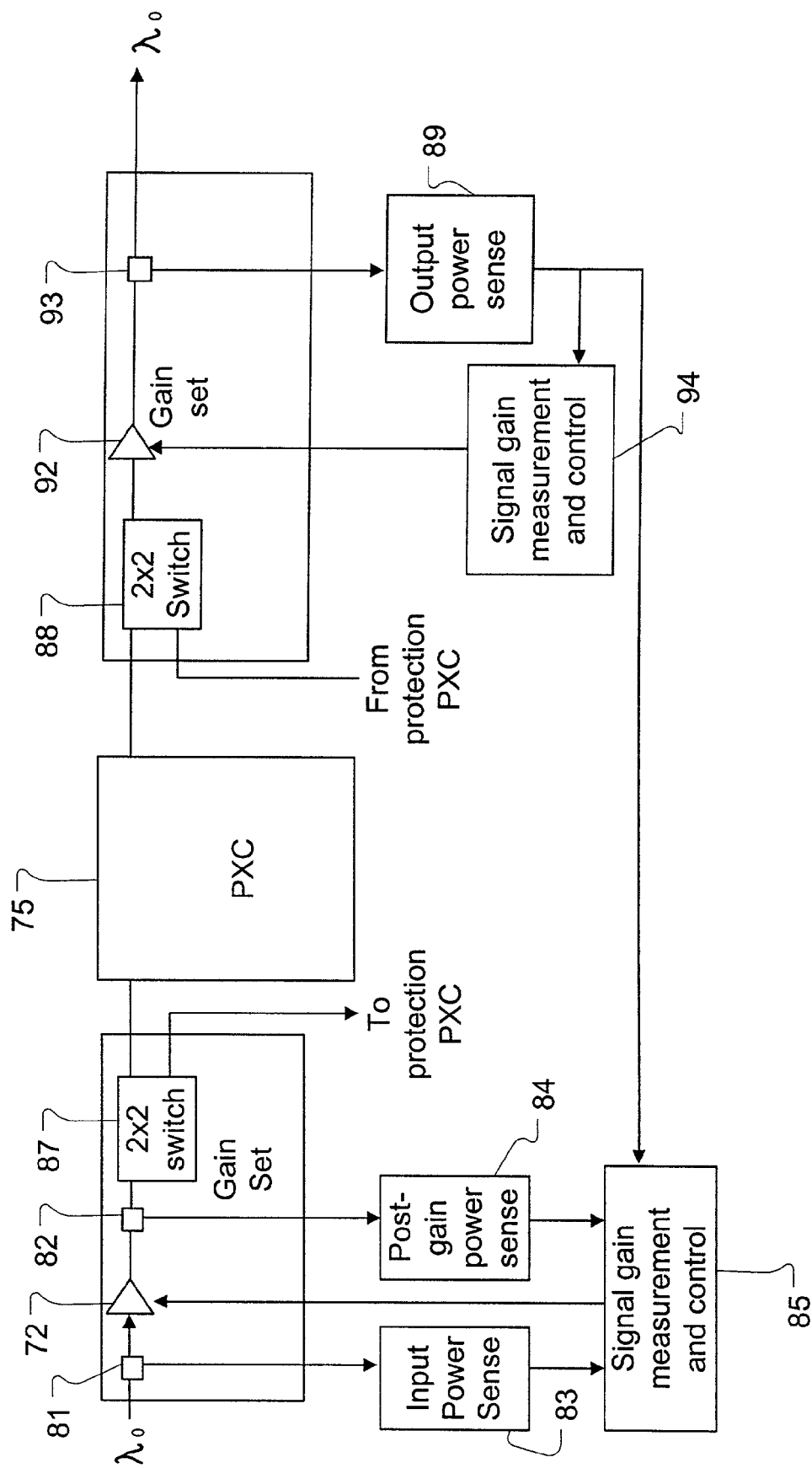
FIG. 11 is a diagram of a control system for the architecture of FIG. 10.

FIG. 11 illustrates the control system for balancing switch signals in the system of FIG. 10. Elements of FIG. 11 which correspond to those depicted in FIG. 7 have been given the same reference numerals. The additional components in FIG. 11 include output amplifier 92 and signal gain measurement and control circuit 94. As shown, the power level of the output signal at node 93 is detected and sensed by output power sensing circuit 89, which provides that information, not only to input-side power gain control circuit 85, as described above, but also to output-side signal gain measurement and control circuit 94. Circuit 94 controls amplifier 92. The structure of FIG. 11 makes possible at least two modes of operation which are advantageous. The first mode is referred to here as output power regeneration with variable gain amplifiers. In this mode the switch losses are compensated and the output power is leveled relative to a desired value. The input power with a dynamic range between pmin and pmax is compensated for by using a fixed gain amplifier (or a variable gain amplifier) 72. Then, variable gain amplifier 92 is used to boost the signal (after switching) to the desired output reference level. Two stage amplification allows the power and output signal levels to be maintained over a broader dynamic range at the input as expected for all-optical networks applications.

Figure 12:
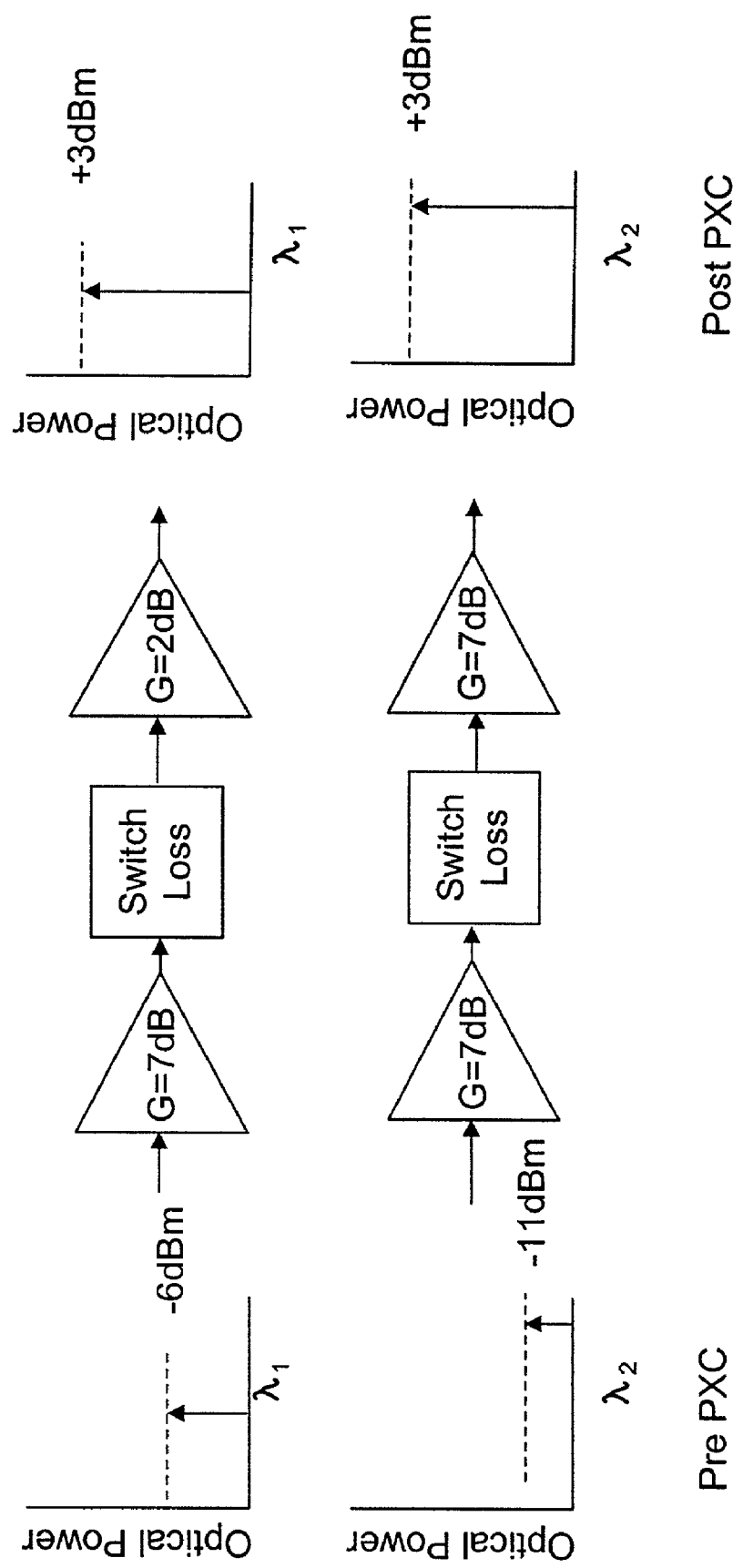
FIG. 12 is an example of output level regeneration.

Operation of the control system in this manner is shown by FIG. 12. The upper portion of FIG. 12 illustrates amplification for a first wavelength, λ1, while the lower portion illustrates amplification for a second wavelength, λ2. As illustrated, for λ1 the input signal is at −6 dB, while λ2 is at −11 dB. A fixed gain of 7 dB is applied to each input signal, and then these input signals are supplied to PXC 75. PXC 75 introduces some loss to λ1 and λ2, which loss is not necessarily the same for each wavelength. Variable output amplification is then applied, with 2 dB applied to λ1 and 7 dB applied to λ2. The result is two output signals, each of +3 dB strength.

Figure 13:
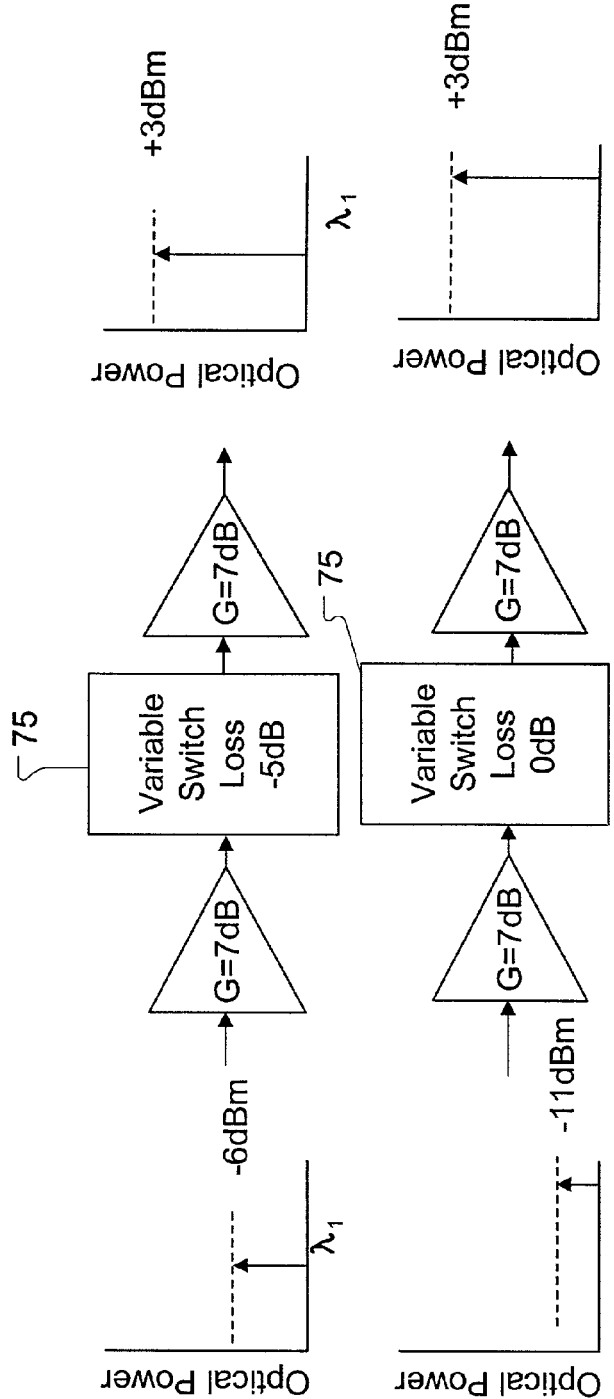
FIG. 13 is another example of output level regeneration.

The second mode of operation for the system depicted in FIGS. 10 and 11 is to provide output regeneration with fixed gain amplifiers. In this case, the optical switch itself is used to introduce losses between the input and output stages, thereby providing compensation for the different input signal strengths. This approach is illustrated in FIG. 13. As shown there, fixed amplification of 7 dB is applied at each of the input and output amplifiers for each of the channels or wavelengths. A variable switch loss of −5 dB is applied to the switching operation of the first channel, and a variable switching loss of 0 dB is applied to the second channel, resulting in a matched output signals of +3 dB after fixed 7 dB amplification of each channel.

Figure 14:
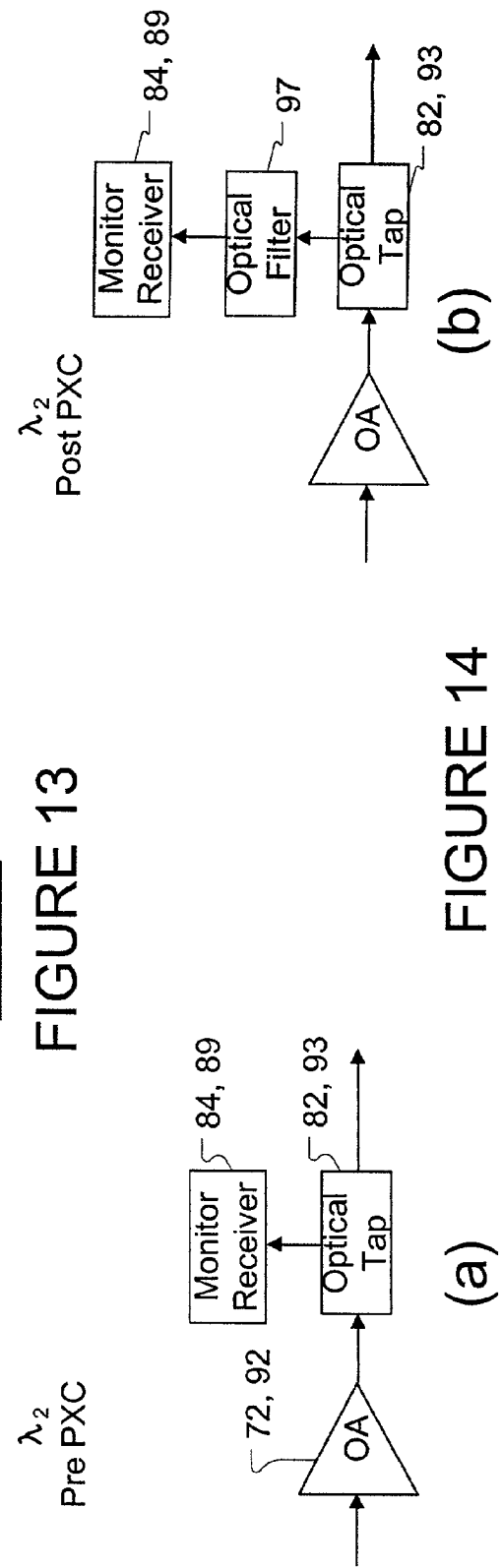
FIGS. 14a and 14b illustrate optical amplification in conjunction with a monitor tap.
Figure 15:
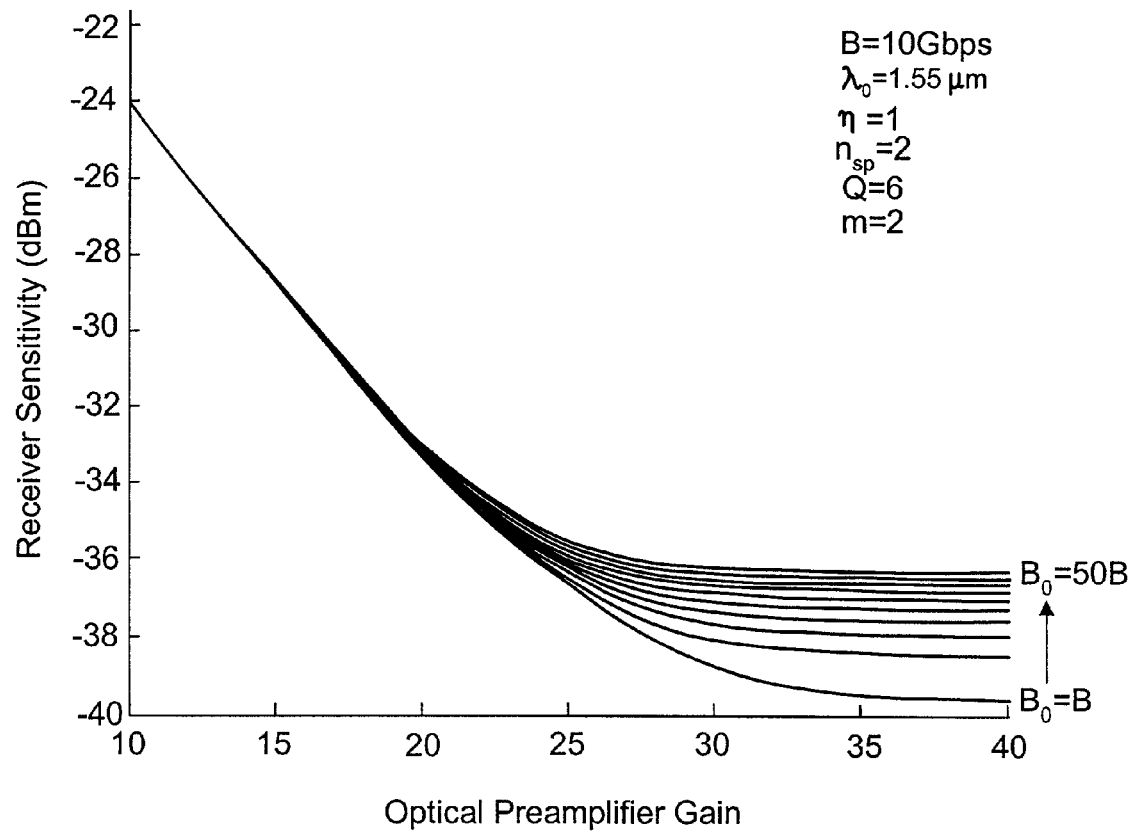
FIG. 15 illustrates an example of optically preamplified receiver sensitivity.

One issue which results from optical amplification in the embodiments depicted above involves the signal-to-noise ratio. In the embodiments described, if the amplification is applied to the entire incoming signal, not only is the data signal amplified, but the noise present on the fiber is also amplified. Therefore, in some embodiments, an optical filter will be applied to the signal following amplification. This implementation is depicted in FIG. 14. The incorporation of an optical filter, however, adds to the cost and complexity of the system, and depending upon the particular circumstances, can require wavelength locking to stabilize the pass band relative to the incoming channel. The impact, however, of not using a filter is to increase the noise produced by various sources, including signal-spontaneous beating and spontaneous-spontaneous beating at the receiver. FIG. 14a illustrates the optical amplifier 72 or 92, the optical tap 82 or 93, and the monitor, receiver, or other sensor 84 or 89, as previously described. In FIG. 14b an optical filter 97 has been added between the tap 82, 93 and the receiver 84, 89 to provide the needed filtering. Likewise, the filter 97 may be placed elsewhere in the optical path as a function of switch architecture and implementation.

Figure 16:
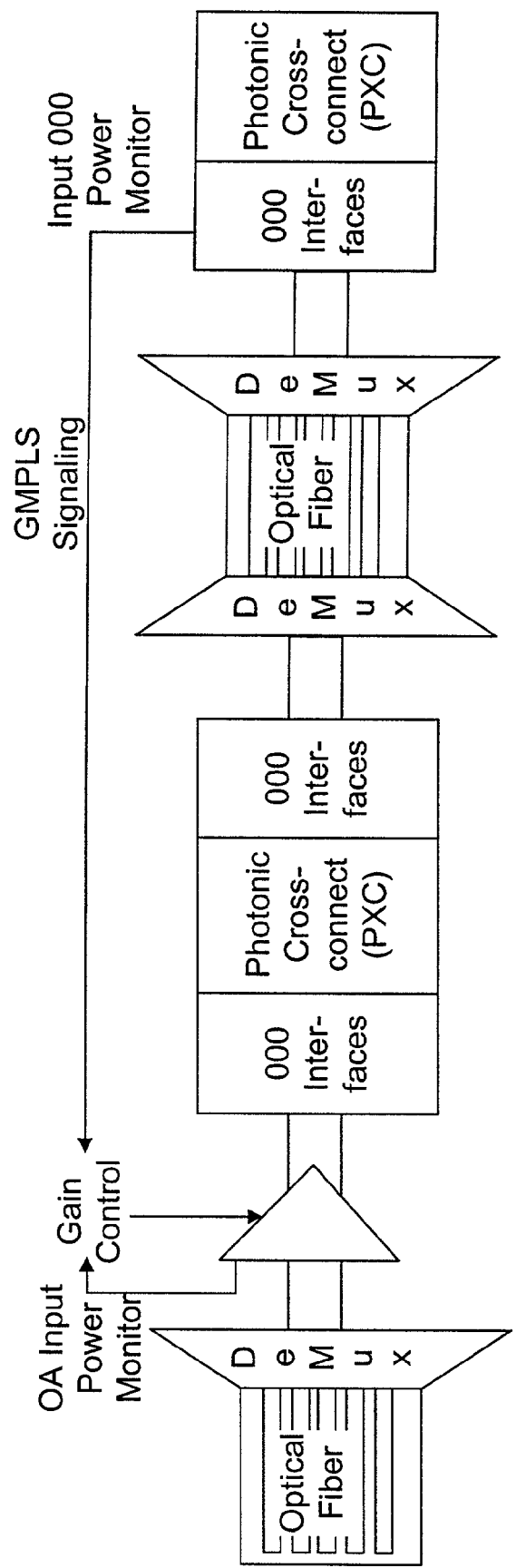
FIG. 16 is a diagram illustrating the use of control plane software to control gain at remote nodes.

Another advantage of the invention is that the gain control may be done within a node, and across multiple nodes, via fiber optical links using control plane software. As shown in FIG. 16, typical control plane software such as multiprotocol label switching (GMPLS) can be used to control gain at remote nodes. This allows amplifier gain to be used to equalize losses across an arbitrary number of switches and network elements based on power sensed at any point within the network.

Figure 1:
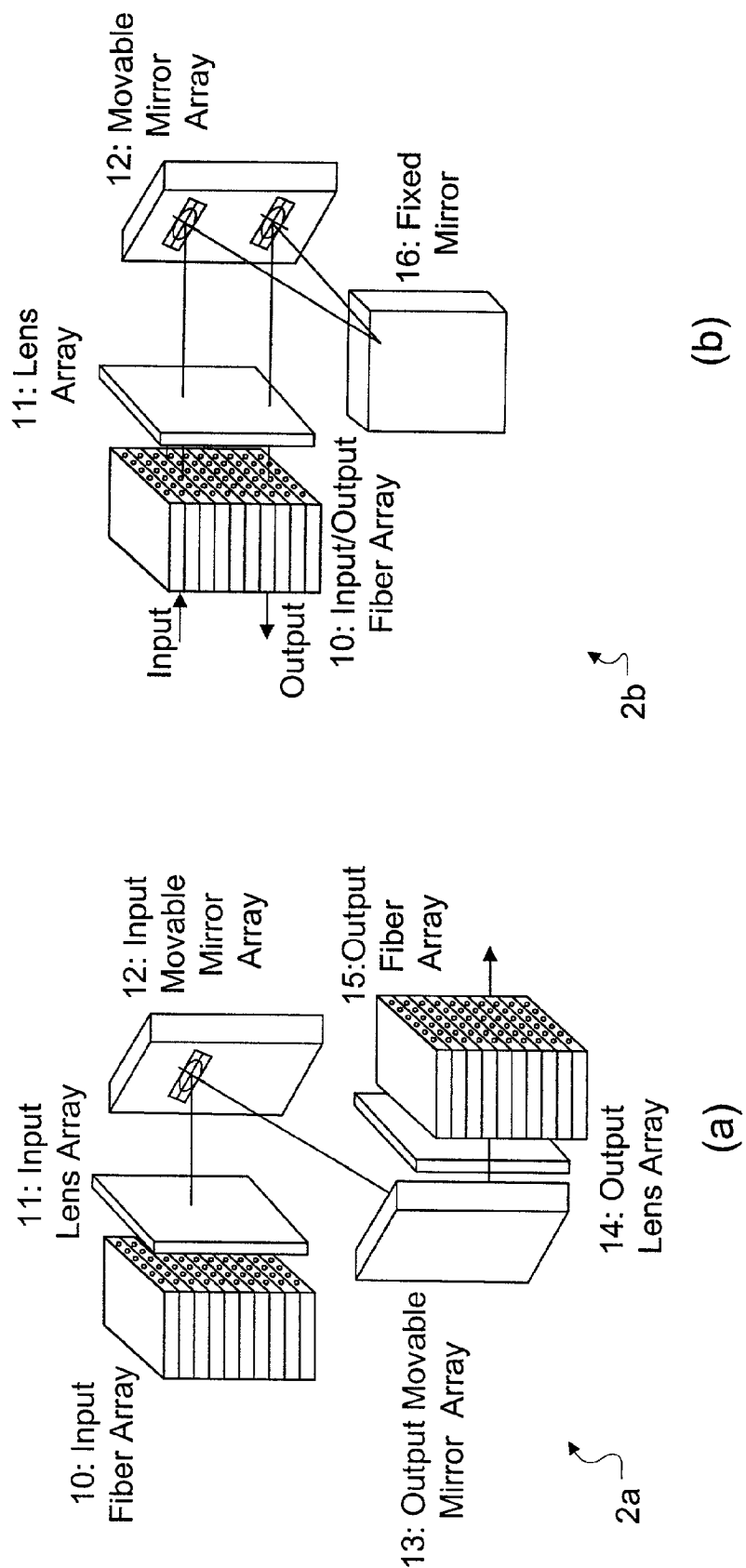
FIGS. 1a and 1b illustrate prior art MEMS switching architectures.
Figure 2:
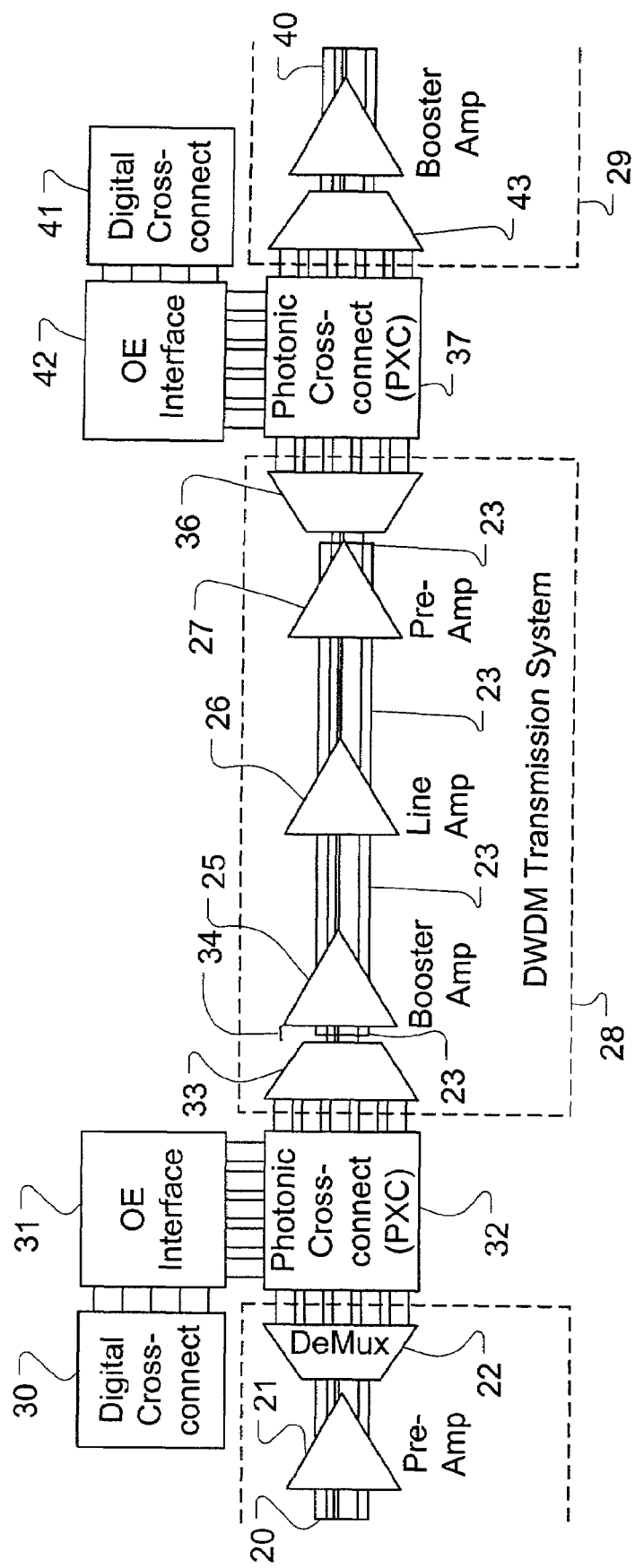
FIG. 2 illustrates a prior art amplification technique for optical networks.

The capability of combining amplification and attenuation provides significant flexibility in the MEMS switch architecture of the preferred embodiment. To perform attenuation, the optical beams can be intentionally and controllably misaligned as they pass through the switch. This technique can assist in equalizing output optical power in the various demultiplexed channels, particularly if fixed gain amplifiers are used. The attenuation can be performed by adjustment of the analog controls used to position the mirrors in each of the mirror arrays, whether implemented as two separate arrays or as a single array with a fixed mirror (see FIG. 1). In a typical MEMS switch, each mirror is rotated in one axis and contained in a frame that rotates in another axis. Typically, this second axis is perpendicular to the mirror axis. Attenuation of the optical signals can be increased by misaligning the input mirror frame, the input mirror, and output mirror, or the output mirror frame. Of course, excessive misalignment can create optical crosstalk which can degrade the functionality of the switch. Generally, in the preferred embodiment, mistuning the output mirror or output mirror frame result in less cross talk than mistuning the input mirror or input mirror frame.

Although the foregoing has been a description of the preferred embodiments of the invention, it should be understood that these embodiments are intended to be illustrative of the invention, as opposed to limiting of the invention. For example, the signal strengths used throughout this explanation are exemplary, and not intended as limiting the scope of this invention. In addition, a MEMS-based PXC is used for illustration, but the core switching function may be provided by other mechanisms, such as holography, direct fiber manipulation, refraction, etc. The scope of the invention is set forth in the appended claims.

What is claimed is:

1. A photonic switching system comprising:
    a demultiplexer connected to at least one optical fiber for dividing light passing through the optical fiber into optical signals of different wavelengths and supplying the optical signals separately from each other to a first set of nodes;
    a first plurality of optical amplifiers coupled to the first set of nodes with each optical amplifier to receive one of the optical signals and to amplify the received optical signal, wherein the gain of each optical amplifier is individually controlled to manage power levels, compensate for losses, and equalize loss non-uniformities of the optical signals based on the wavelength of the optical signal received by each optical amplifier; and
    an optical switch core having a plurality of input nodes and a plurality of output nodes, the input nodes of the optical switch core to receive the amplified optical signals, wherein the optical switch core to switch the amplified optical signals from the input nodes to the output nodes of the optical switch core, wherein the optical switch core controllably attenuates the optical signals supplied to its input nodes.

2. The photonic switching system of claim 1 further comprising a multiplexer connected to the output nodes of the optical switch core, the multiplexer to receive the amplified optical signals and multiplex the amplified optical signals with other signals to provide output signals from the switching system.

3. A photonic switching system as in claim 1 wherein the gain of each optical amplifier is individually controlled based on the input power of the optical signal received by each optical amplifier.

4. A photonic switching system as in claim 1 wherein the optical signals comprise optical signals having different wavebands.

5. A photonic switching system as in claim 4 wherein the different wavebands comprise at least one of the C, L, and S wavebands.

6. A photonic switching system as in claim 1 wherein the gain of each optical amplifier is individually controlled based on the output power of the optical signal received by each optical amplifier.

7. A photonic switching system as in claim 1 further comprising a second plurality of optical amplifiers coupled to the output nodes of the optical switch core and to the multiplexer, wherein the second plurality of optical amplifiers to receive the optical signals and further amplify the optical signals positively or negatively before supplying the optical signals to the multiplexer.

8. A photonic switching system as in claim 7 wherein the gain of each optical amplifier is individually controlled based on the input and output power of the optical signal received by each optical amplifier.

9. A photonic switching system as in claim 7 wherein the gain of each optical amplifier is individually controlled based on the wavelength of the optical signal received by each optical amplifier.

10. A photonic switching system comprising:
   a demultiplexer connected to a plurality of optical fibers for separating light passing through the optical fibers into optical signals of different wavelengths, and supplying the optical signals separately from each other to a first set of nodes;
   at least one optical amplifier coupled to receive at least one of the different optical signals and amplify that optical signal before supplying it to a node in a first set of input nodes, wherein the gain of each optical amplifier is individually controlled to manage power levels, compensate for losses, and equalize loss non-uniformities of the optical signals based on the wavelength of the optical signal received by each optical amplifier; and
   an optical switch core having a plurality of input nodes coupled to the first set of input nodes and having a plurality of output nodes, to receive the amplified optical signal from the first set of input nodes and transfer the amplified optical signal to a desired ones of the plurality of output nodes, wherein the optical switch core controllably attenuates the optical signals supplied to its input nodes.

11. A photonic switching system as in claim 10 wherein the gain of each optical amplifier is individually controlled based on the input and output power of the optical signal received by each optical amplifier.

12. The photonic switching system of claim 10, further comprising a multiplexer connected to the output nodes to receive the switched optical signals and multiplex them together before providing them as an output signal from the switching system.

13. A photonic switching system as in claim 10 wherein the optical signals comprise optical signals having different wavebands.

14. A photonic switching system as in claim 13 wherein the different wavebands comprise at least one of the C, L, and S wavebands.

15. A photonic switching system as in claim 10 wherein the at least one optical amplifier comprises a plurality of optical amplifiers and each amplifier provides a fixed amount of amplification to the optical signal supplied to it.

16. A photonic switching system as in claim 10 wherein the at least one optical amplifier comprises a plurality of optical amplifiers and the gain of each of the plurality of optical amplifiers is controllable.

17. A photonic switching system as in claim 16 wherein the gain of each of the plurality of optical amplifiers is controlled to cause the different optical signals supplied to the output nodes to have substantially equal power levels.

18. A photonic switching system as in claim 17 wherein each of the second optical amplifiers has controllable gain.

19. A photonic switching system as in claim 10 further comprising a second set of optical amplifiers coupled to the output nodes and to the multiplexer to receive the amplified optical signals and further amplify them positively or negatively before supplying them to the multiplexer.

20. A photonic switching system as in claim 10 further comprising a control system coupled to the at least one optical amplifier to control it.

21. A photonic switching system as in claim 20 wherein the control system further comprises a filter to filter the optical signals.

22. A method of switching signals in a photonic switch comprising:
   demultiplexing a light beam into at least two optical signals having different wavelengths;
   separately amplifying each optical signal with a different optical amplifier, wherein the gain of each optical amplifier is individually controlled to manage power levels, compensate for losses, and equalize loss non-uniformities of the optical signals based on the wavelength of the optical signal received by each optical amplifier;
   switching the optical signals from input nodes to desired output nodes of an optical switch core, wherein the optical switch core controllably attenuates the optical signals supplied to its input nodes; and
   multiplexing the optical signals before providing them to a destination.

23. A method of switching signals as in claim 22 wherein separately amplifying the optical signals comprises amplifying each of the optical signals with the same amount of gain.

24. A method of switching signals as in claim 22 wherein separately amplifying the two optical signals comprises amplifying each of the two optical signals with different amounts of gain.

25. A method of switching signals as in claim 22 wherein separately amplifying the two optical signals generates two optical signals having substantially the same power level.

26. A method of switching signals as in claim 22 further comprising further amplifying the optical signals prior to multiplexing the optical signals.

27. A method of switching signals as in claim 26 wherein further amplifying comprises amplifying each of the two optical signals with the same amount of gain.

28. A method of switching signals as in claim 27 further comprising introducing different losses into the two optical signals prior to further amplifying the optical signals.

29. A method as in claim 28 further comprising filtering at least one of the optical signals to determine the amount of amplification.

* * * * *